(12) United States Patent
Simopoulos et al.

(10) Patent No.: US 6,537,218 B1
(45) Date of Patent: Mar. 25, 2003

(54) MEDICAL DIAGNOSTIC IMAGING SYSTEM AND METHOD FOR ADAPTIVE INTERLINE DELAY AND TRANSMIT POWER

(75) Inventors: Constantine Simopoulos, Menlo Park, CA (US); Kutay Ustuner, Mountain View, CA (US); Albert Gee, Los Altos, CA (US); Danhua Zhao, Milpitas, CA (US)

(73) Assignee: Acuson Corporation, Mountain View, CA (US)

( * ) Notice: Subject to any disclaimer, the term of this patent is extended or adjusted under 35 U.S.C. 154(b) by 0 days.

(21) Appl. No.: 09/558,426

(22) Filed: Apr. 25, 2000

(51) Int. Cl.$^7$ ................................................. A61B 8/00
(52) U.S. Cl. ...................... 600/447; 600/443; 600/441; 600/453; 600/454; 600/425
(58) Field of Search ................................. 600/443, 425, 600/441, 453, 454; 73/631

(56) References Cited

U.S. PATENT DOCUMENTS

| | | | | |
|---|---|---|---|---|
| 4,395,912 A | * | 8/1983 | Hassler | 73/626 |
| 4,817,614 A | * | 4/1989 | Hassler et al. | 128/660.05 |
| 4,819,652 A | * | 4/1989 | Micco | 600/455 |
| 4,852,577 A | * | 8/1989 | Smith et al. | 128/660.07 |
| 5,313,947 A | * | 5/1994 | Micco | 600/455 |
| 5,325,858 A | * | 7/1994 | Moriizumi | 600/443 |
| 5,379,642 A | * | 1/1995 | Reckwerdt et al. | 600/447 |
| 5,383,457 A | * | 1/1995 | Cohen | 600/443 |
| 5,438,994 A | * | 8/1995 | Starosta et al. | 600/447 |
| 5,458,129 A | * | 10/1995 | Wheeler et al. | 600/454 |
| 5,501,223 A | * | 3/1996 | Washburn et al. | 600/455 |
| 5,617,863 A | * | 4/1997 | Roundhill et al. | 600/447 |
| 6,113,544 A | * | 9/2000 | Mo | 600/443 |
| 6,159,153 A | * | 12/2000 | Dubberstein et al. | 128/916 |
| 6,210,328 B1 | * | 4/2001 | Robinson et al. | 600/437 |

OTHER PUBLICATIONS

Freeman, Steven R. et al., Delta–Sigma Oversampled Ultrasound Beamformer with Dynamic Delays, IEEE Transactions on Ultrasonics, Ferroelectrics, and Frequency Control, vol. 46, No. 2, p. 320–332, Mar. 1999.*

* cited by examiner

Primary Examiner—Marvin M. Lateef
Assistant Examiner—William C Jung (57) ABSTRACT

A medical diagnostic ultrasonic imaging system analyzes receive signals generated by the system to adaptively set the interline delay and/or the transmit power to optimize frame rate while reducing or eliminating the wraparound artifact associated with transmit events that are too closely spaced in time for currently prevailing imaging conditions.

12 Claims, 9 Drawing Sheets

MEDICAL DIAGNOSTIC IMAGING SYSTEM AND METHOD FOR ADAPTIVE INTERLINE DELAY AND TRANSMIT POWER

BACKGROUND

The present invention relates to medical diagnostic imaging systems and methods, and in particular to improvements that adaptively reduce or eliminate the wraparound artifact, also known as the range ambiguity artifact or the multi-path artifact.

A frame of an ultrasound image is generated by many successive transmit firings. In commonly used imaging systems, the interval between firings ("interline delay") is determined offline and is fixed for all imaging situations. Transmit power is generally determined by either the system limitations such as the maximum output voltage and transducer sensitivity or by regulatory limitations such as maximum power levels allowed by the FDA.

In one prior art system, the interline delay between consecutive transmit events is calculated offline using predetermined attenuation coefficients. Generally, conservative values are chosen to ensure that the wraparound artifact is avoided for all imaging situations. Another prior art approach is to determine a minimum interline delay by clinically evaluating the wraparound artifact. Once again, a conservative value is generally chosen to ensure that the wraparound artifact is avoided in all imaging situations.

Another prior art approaches to acquire a frame of image data by firing scan lines from the center lines of the imaged region to the edge lines. The interline interval decreases from the center lines to the edge lines. For example, if a total number of lines in an image frame is 2n, the firing order can be as follows: n, n+1, n−1, n+2, n−2, . . . 2, 2n−1, 1, 2n. The interline delay for the center line is set at a value that ensures that the wraparound artifact is avoided in all imaging situations. See the discussion in U.S. Pat. No. 5,438,994.

The prior art methods described above use preprogrammed interline delays. For this reason, they cannot achieve the optimum tradeoff between frame rate and wraparound artifact reduction for different imaging situations. The firing sequence of the third method described above is inflexible, and it is difficult to optimize both frame rate and wraparound artifact reduction at the same time with this method.

SUMMARY

The preferred embodiments described below adaptively and automatically adjust one or both of the interval between transmit events (the line duration) and the transmit power as a function of the penetration depth. The penetration depth is measured by several approaches, as illustrated by the various embodiments. The frame rate (which is dependent on the line to duration) is then adaptively and automatically set at the maximum possible value for the prevailing imaging conditions, while simultaneously avoiding the wrap-around artifact generated by energy from the previous transmit line. Alternatively, even higher frame rates can be achieved if the penetration length is decreased to match the actual displayed depth. This can be done by decreasing the transmit power. The amount of power decrease can be estimated by measuring the attenuation coefficient in the prevailing imaging conditions. The measurement of the attenuation coefficient can be done by measuring the strength of the received signal as a function of depth.

The following detailed description describes four different methods for using receive signals acquired by an ultrasonic imaging system to estimate the maximum penetration depth, including cross correlating receive signals from two separate transmit events, differencing receive signals from two separate transmit events, comparing a set of receive signals with a background receive signal level, and assessing the true magnitude of the receive signals.

The foregoing paragraphs are intended by way of introduction, and are not intended to limit the scope of the following claims.

DETAILED DESCRIPTION OF THE PRESENTLY PREFERRED EMBODIMENTS

Figure 1:
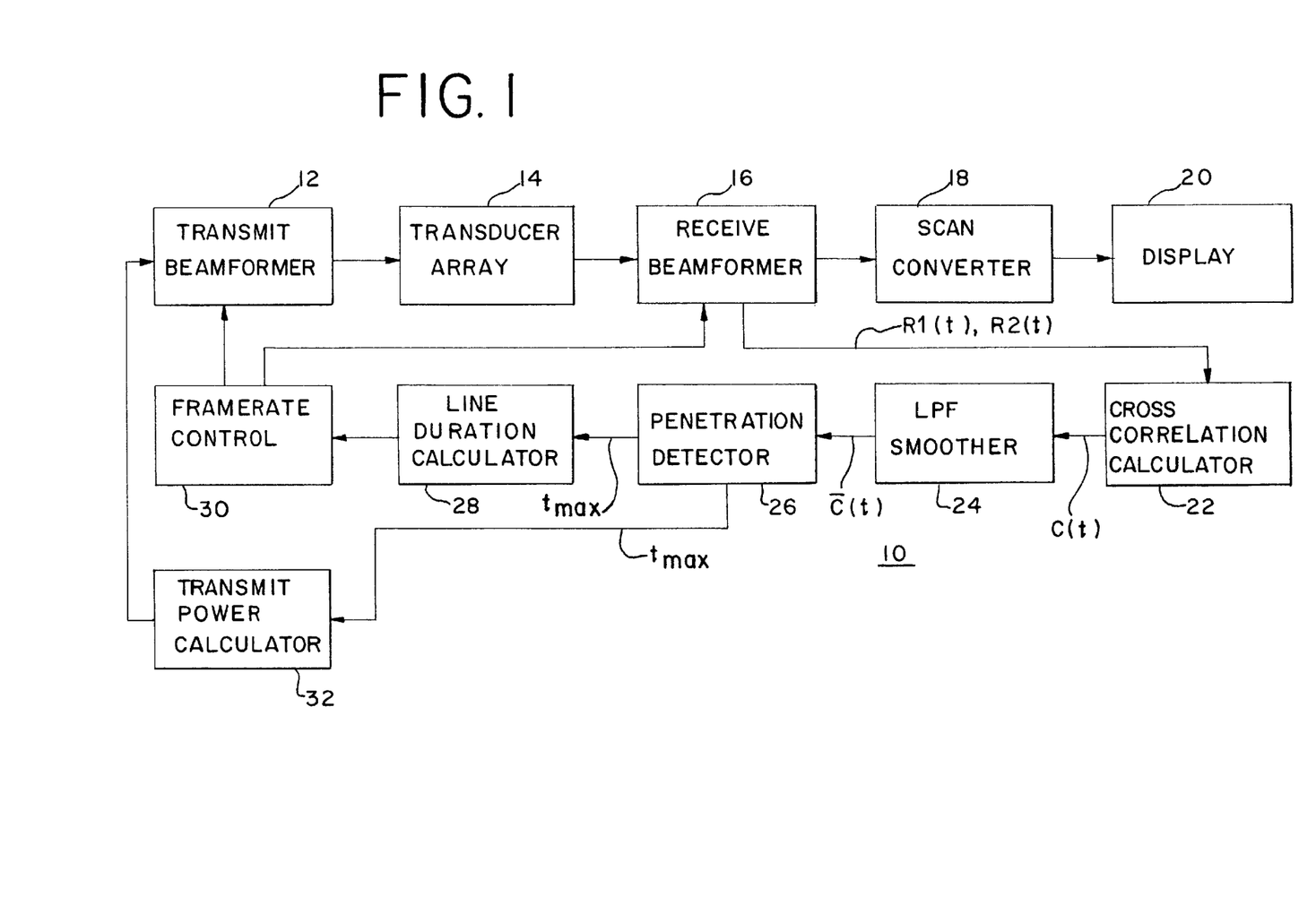
FIG. 1 is a block diagram of a medical diagnostic ultrasonic imaging system that incorporates a first preferred embodiment of this invention.

The first preferred embodiment of this invention will be explained in conjunction with FIGS. 1 through 5. The block diagram of FIG. 1 shows a medical diagnostic ultrasonic imaging system 10 that adaptively sets the interline delay between successive transmit events and/or the transmit power in order to reduce or eliminate wraparound artifacts.

Wraparound artifacts are a type of interference resulting from echoes of ultrasonic energy from transmit events prior to the intended transmit event. For example, if two transmit events T1 and T2 are fired at times 0 and t, and if the interline delay t is less than the time required for echoes from T1 to dissipate, then the receive signal R2 acquired in response to the transmit event T2 will include components associated with echoes from the first transmit event T1. These components are undesirable because they are improperly shown at the wrong range. It is an object of the present invention to provide a high frame rate adaptively without excessive wraparound artifact.

The system 10 includes a transmit beamformer 12 that applies transmit signals to the individual transducer elements of a transducer array 14. Generally, these transmit signals are timed and phased to cause the transducer array 14 to emit ultrasonic energy that is focused along a selected scan line. Ultrasonic echoes from scattering sites return ultrasonic energy to the transducer array 14, which generates receive signals that are applied to a receive beamformer 16. The receive beamformer 16 applies appropriate gains, delays, and phase shifts to cause echoes from selected regions to add coherently to form beamformed receive signals that are applied to a scan converter 18. The scan converter 18 converts the receive signals to a form appropriate for display on a display 20.

The elements 12 through 20 of the system 10 can be formed conventionally, using any suitable technology. The beamformers 12, 16 can be analog or digital, and they can, for example, be formed as described in U.S. Pat. Nos. 5,675,554; 5,685,308 and 5,696,737, assigned to the assignee of the present invention. The transducer array 14 can be of any desired form, including 1, 1.5 and two-dimensional arrays. Single transducer elements that are mechanically steered can be substituted for the transducer array 14. Suitable examples of transducer arrays are described in U.S. Pat. Nos. 5,640,370; 5,743,855 and 5,771,896, assigned to the assignee of the present invention. Similarly, a wide variety of scan converters can be used, including those described in U.S. Pat. No. 5,563,810, assigned to the assignee of the present invention.

In the system 10, receive signals from the beamformer 16 are applied in parallel to the scan converter 18 discussed above and to a cross correlation calculator 22. The cross correlation calculator 22 generates a cross correlation coefficient $C(t)$ of two receive signals $R1(t)$, $R2(t)$ as described in greater detail below in conjunction with FIG. 2. The cross correlation coefficient $C(t)$ is applied to a low pass filter 24 that acts as a smoother to generate a smoothed cross correlation coefficient $\overline{C}(t)$ that is applied to a penetration detector 26. The penetration detector 26 applies a threshold to $\overline{C}(t)$ to find the longest range at which $\overline{C}(t)$ shows substantial cross correlation between $R1(t)$ and $R2(t)$.

The output of the penetration detector 26 is a penetration depth parameter that is indicative of the maximum penetration associated with the receive signals $R1(t)$, $R2(t)$. The penetration depth parameter can take any suitable form. For example, it may be a measure of the range associated with the maximum penetration depth, or of the propagation time associated with the maximum penetration depth (either one-way propagation time or two-way propagation time). Other parameters are possible. In this example, the penetration depth parameter takes the form of $t_{max}$, the two-way propagation time of the longest range at which the receive signals $R1(t)$ and $R2(t)$ show substantial cross correlation.

The penetration depth parameter $t_{max}$ is applied to a line duration calculator 28 that selects an optimal interline delay for the currently prevailing imaging conditions. In this example, the line duration calculated by the element 28 is a direct function of $t_{max}$. That is, since there is no substantial cross correlation between $R1(t)$ and $R2(t)$ at ranges associated with two-way propagation times greater than $t_{max}$, the optimal interline delay is only slightly greater than $t_{max}$. For example, the line duration calculator 28 calculates the optimum interline delay by subtracting the minimal system update time from $t_{max}$. The line duration calculator 28 supplies the optimal interline delay to the frame rate control 30, which controls the transmit beamformer 12 and the receive beamformer 16 to achieve the desired interline delay.

The penetration detector 26 also supplies the penetration depth parameter $t_{max}$ to a transmit power calculator 32. The wraparound artifact may be reduced by reducing transmit power appropriately. The transmit power calculator 32 computes the optimum transmit power using the difference between the measured penetration depth and the desired penetration depth. The amount of power reduction is a function of the operating frequency and the desired change in maximum penetration depth. The transmit power calculator 32 applies a control signal to the transmit beamformer 12 to obtain the desired transmit power level. At any given time, the line duration calculator 28 can operate while the transmit power calculator 32 is inactive, the transmit power calculator 32 can operate while the line duration calculator is inactive, or both calculators 28, 32 can be active, working in concert to reduce or eliminate the wraparound artifact while providing a high frame rate.

Power can be adaptively set so that the penetration depth and the displayed depth are equal. Power and penetration depth can be related via an attenuation model. A simple model assuming homogeneous tissue is given by the following formula:

$$P(x)=P_o e^{-ax}, \tag{Eq. 1}$$

where a is the attenuation coefficient, x is the depth, and $P(x)$ is the power at depth x and $P_0$ is the power at depth 0.

The appropriate power level can be set based on a predetermined absorption coefficient and the desired display depth:

$$P_d=P_{ref} e^{2a(x_d-x_{ref})}, \tag{Eq. 2}$$

where $x_d$ is the desired display depth, $P_d$ is a reference power which can be the maximum power allowed by the system or regulations and $x_{ref}$ the corresponding penetration depth.

Thus, the line duration calculator 28 and the frame rate control 30 adaptively vary the interline delay as a function of the penetration depth parameter $t_{max}$ and the transmit power calculator 32 adaptively varies the transmit power as a function of the penetration depth parameter $t_{max}$.

Figure 2:
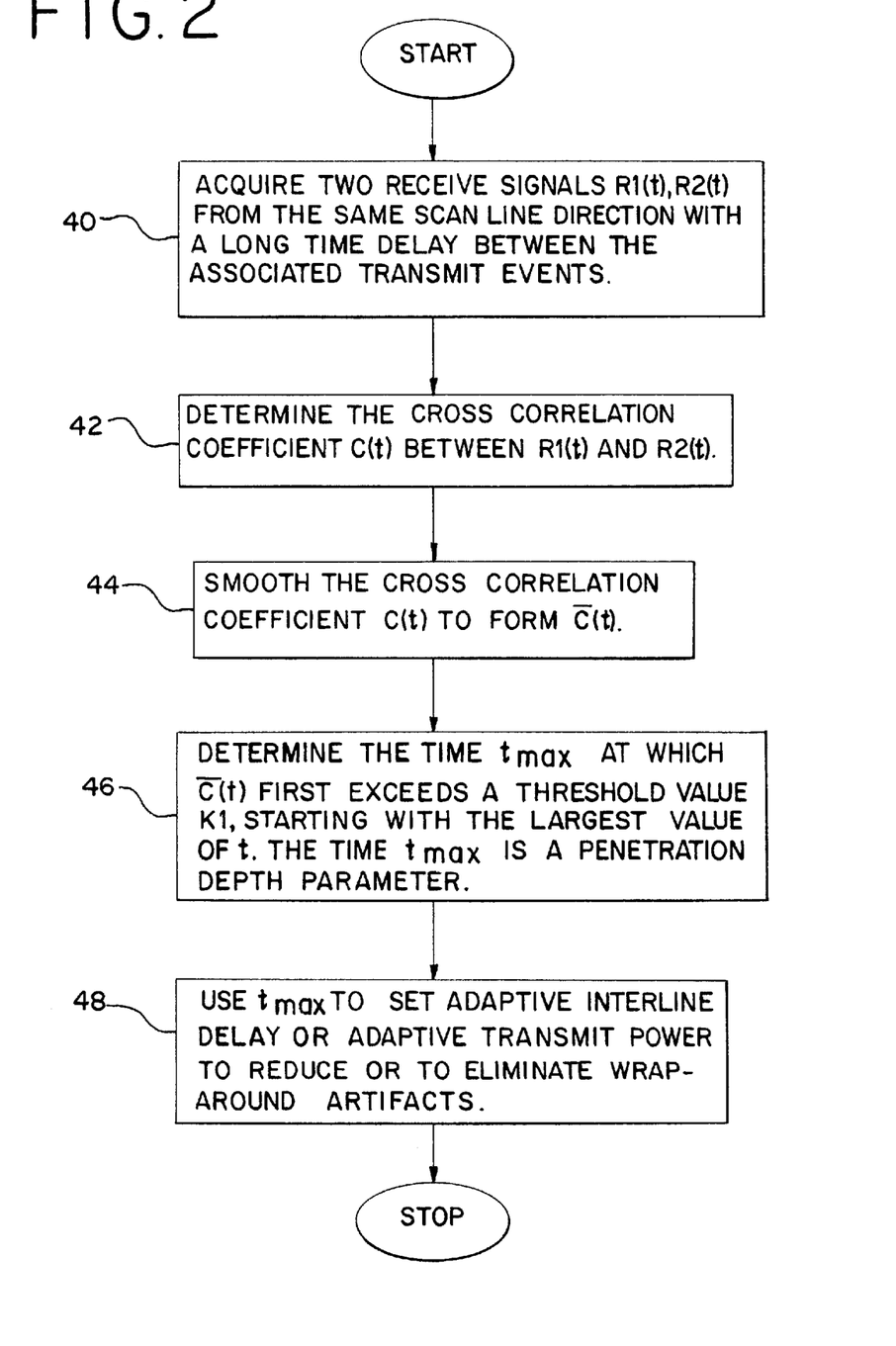
FIG. 2 is a flow chart of a method performed by the embodiment of FIG. 1.

FIG. 2 provides a flow chart of a method implemented by the system 10 of FIG. 1. In block 40, two receive signals $R1(t)$, $R2(t)$ are acquired using acoustic lines transmitted along the same scan direction, and a long time delay between the associated transmit events. This time delay should be long enough to prevent wraparound artifacts in receive signals $R2(t)$ based on reverberations, echoes, or multi-path echoes from the first transmit event associated with $R1(t)$.

Next, in block 42, the cross correlation coefficient $C(t)$ is determined between $R1(t)$ and $R2(t)$, and the cross correlation coefficient $C(t)$ is smoothed to form $\overline{C}(t)$ in block 44.

In block 46, the time $t_{max}$ is determined at which $\overline{C}(t)$ first exceeds a threshold value K1, starting with the largest value of t. As explained above, the time $t_{max}$ is a penetration depth parameter. In block 48, the parameter $t_{max}$ is used to set the adaptive interline delay and/or the adaptive transmit power to reduce or eliminate wraparound artifacts.

Figure 3:
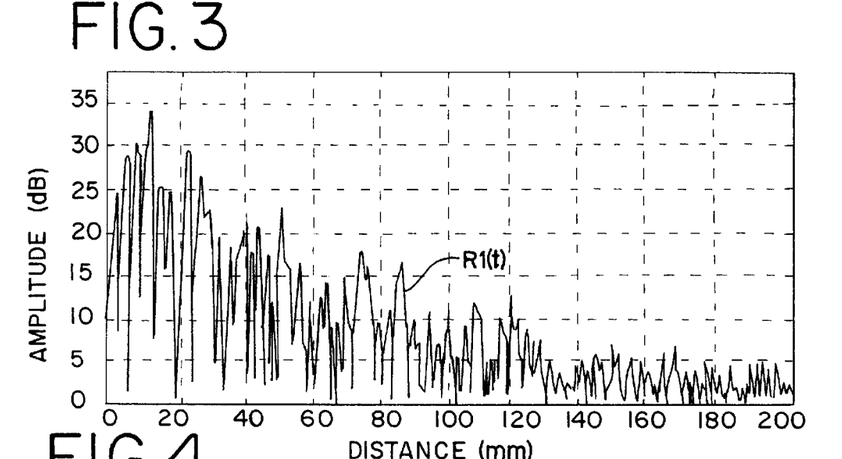
FIGS. 3, 4 and 5 are graphs of the first and second receive signals $R1(t)$ and $R2(t)$ along with the associated smoothed cross correlation coefficient $\overline{C}(t)$ of the method of FIG. 2.
Figure 4:
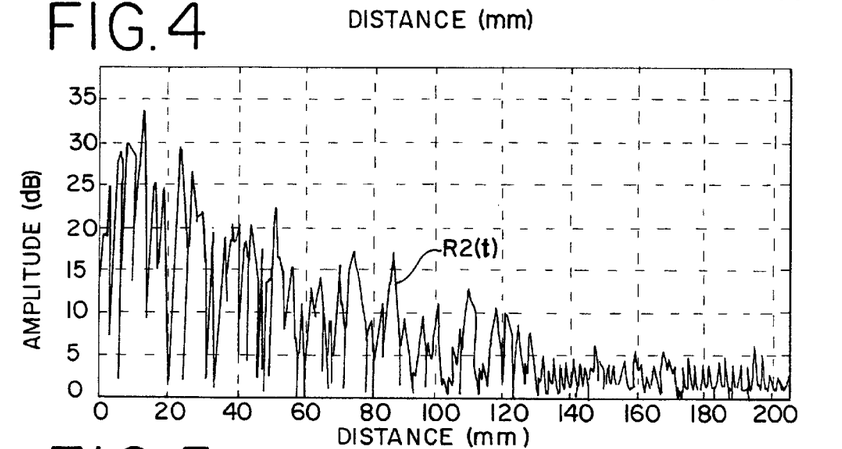
Figure 5:
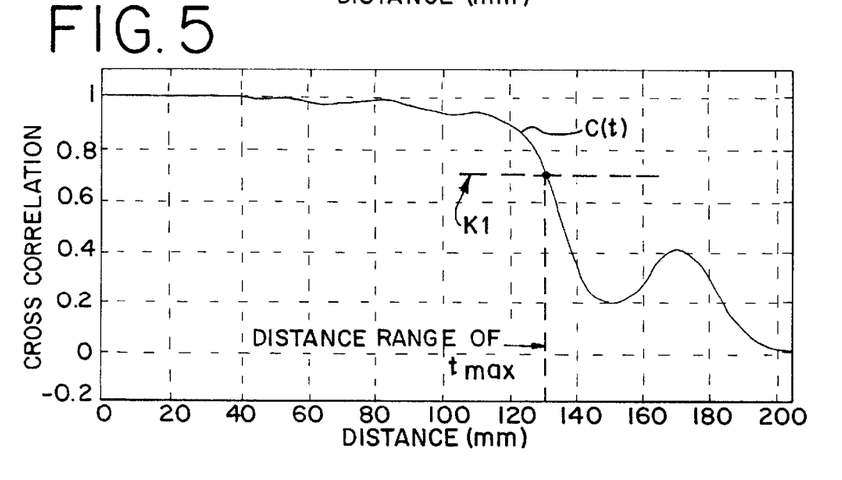

FIGS. 3 through 5 illustrate selected aspects of the method of FIG. 2. FIGS. 3 and 4 show the receive signals $R1(t)$ and $R2(t)$, respectively, as a function of range. The graphs of FIGS. 3 and 4 are simulated receive signals $R1(t)$, $R2(t)$ with additive Gaussian noise.

FIG. 5 shows the smoothed cross correlation coefficient $\overline{C}(t)$ and the threshold value K1. The cross correlation coefficient $C(t)$ is calculated from a small sample (5–20 mm) between the two receive lines $R1(t)$, $R2(t)$. The cross correlation coefficient $C(t)$ is then smoothed by averaging a number of sample points (e.g., 50–200) along the distance axis. The threshold value K1 is preferably set at the region of large slope between the closely correlated region at close ranges and the substantially less correlated region at large ranges. In FIG. 5, $\overline{C}(t)$ rises above the threshold value K1 (proceeding from the largest time to smallest time) at a time $t_{max}$ associated with receive signals at a range of about 133 mm. Ultrasonic signals have a known average propagation velocity within the body, and it is a simple matter to convert range to round-trip propagation time, and vice versa.

In the example of FIG. 2, the receive signals $R1(t)$ and $R2(t)$ are associated with two firings of the same acoustic line, and they are received on the same acoustic line. The receive signals $R1(t)$ and $R2(t)$ are long duration receive signals to ensure detection of deep, strong reflectors.

The method of FIG. 2 can be repeated for every line group. A line group can be made up from one to the total number of scan lines within an image frame. Alternatively, the whole optimization can be performed at different intervals, e.g., every nth frame (n=1, 2, 3 . . . ).

Figure 6:
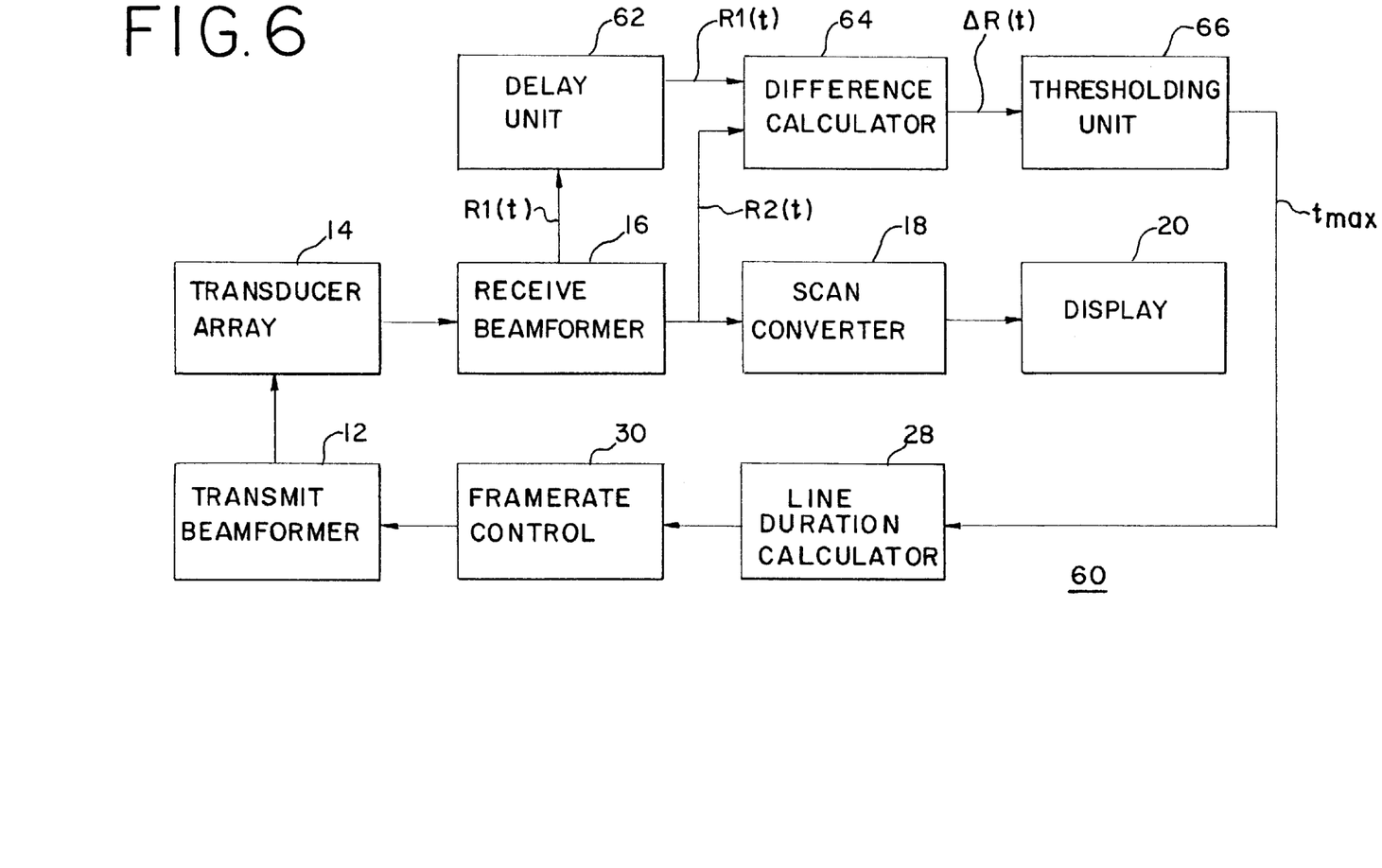
FIG. 6 is a block diagram of a medical diagnostic ultrasonic imaging system that incorporates a second preferred embodiment of this invention.
Figure 7:
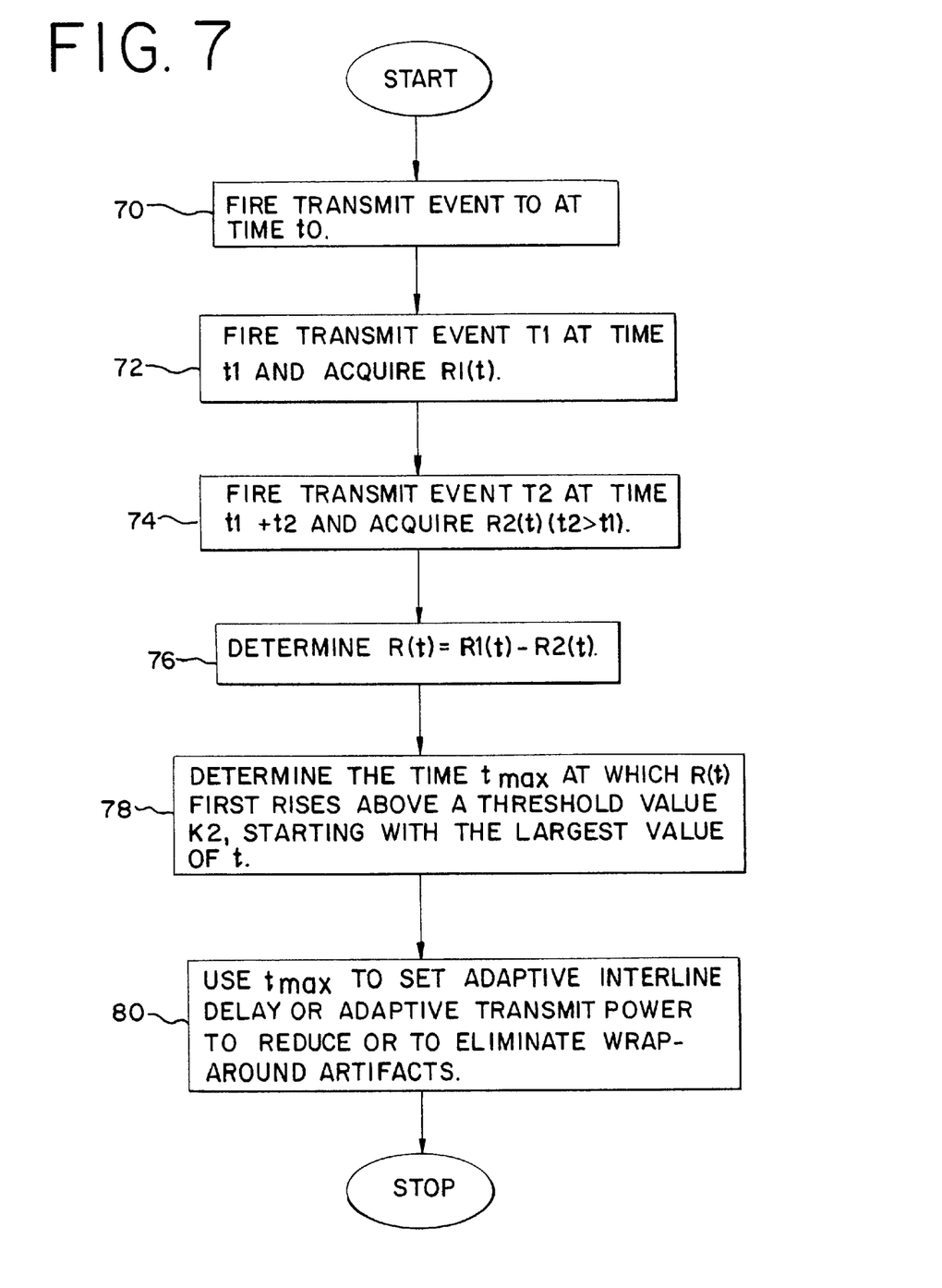
FIG. 7 is a flow chart of a method performed by the embodiment of FIG. 6.

FIGS. 6 and 7 relate to a second preferred embodiment of this invention that includes a medical diagnostic ultrasonic imaging system 60. The system 60 includes elements 12 through 20, which may be identical to the elements 12 through 20 described above.

In the system 60, the receive beamformer 16 supplies receive signals both to a delay unit 62 and to a difference calculator 64. The difference calculator also receives delayed receive signals from the delay unit 62, and the difference calculator 64 forms a difference signal $\Delta R(t)$ that is applied to a thresholding unit 66. The delay unit 62 synchronizes the receive signals $R1(t)$ and $R2(t)$ to facilitate formation of the difference $R(t)$ by the difference calculator 64. The thresholding unit 66 determines the time $t_{max}$ at which $R(t)$ first rises above a threshold value K2, starting with the largest value of t. The parameter $t_{max}$ is applied to a line duration calculator 28, which generates an input signal to a frame rate control 30. The line duration calculator 28 and the frame rate control 30 may also be identical to corresponding elements of the system 10 of FIG. 1.

FIG. 7 provides a flow chart of a method implemented by the system 60 of FIG. 6. In block 70, a transmit event T0 is fired at time t0, and in block 72 transmit event T1 is fired at time t1. Receive signals $R1(t)$ are then acquired in response to T1.

In block 74, transmit event T2 is fired at time t2, and receive signals $R2(t)$ are acquired. In this example, t1 is purposely set at a value such that the difference t1–t0 is small to ensure that there is a wraparound artifact in $R1(t)$, and t2 is set at a value such that the difference t2–t1 is large to ensure that there is no wraparound artifact in $R2(t)$.

At 76, a difference $R(t)$ is determined between $R1(t)$ and $R2(t)$. At 78, a thresholding operation is applied to determine the time $t_{max}$ at which $R(t)$ first rises above a threshold value K2, starting with the largest value of t. The threshold value of K2 can, for example, be equal to 3dB. At 80, the penetration depth parameter $t_{max}$ is used to set the adaptive interline delay or the adaptive transmit power to reduce or eliminate wraparound artifacts, as described above.

In this example, all three transmit events T0, T1, T2 are directed along the same scan line direction with the same amplitude, and the receive signals $R1(t)$, $R2(t)$ are received along the same scan line.

As before, the method of FIG. 7 can be repeated for every line group, where a line group is made up of from one to the total number of scan lines.

The whole optimization can be performed at different intervals, e.g., every nth frame (n=1, 2, . . . ).

Figure 8:
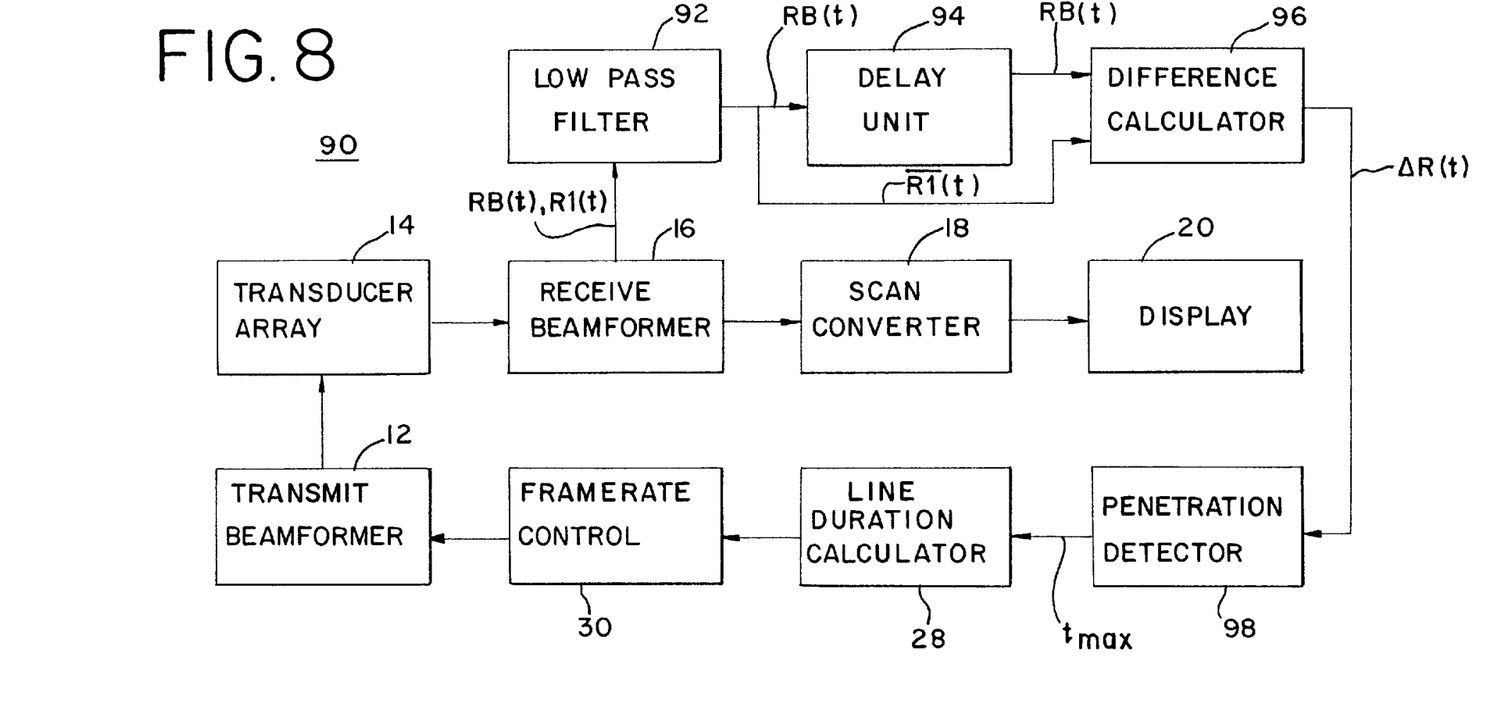
FIG. 8 is a block diagram of a medical diagnostic ultrasonic imaging system that incorporates a third preferred embodiment of this invention.
Figure 9:
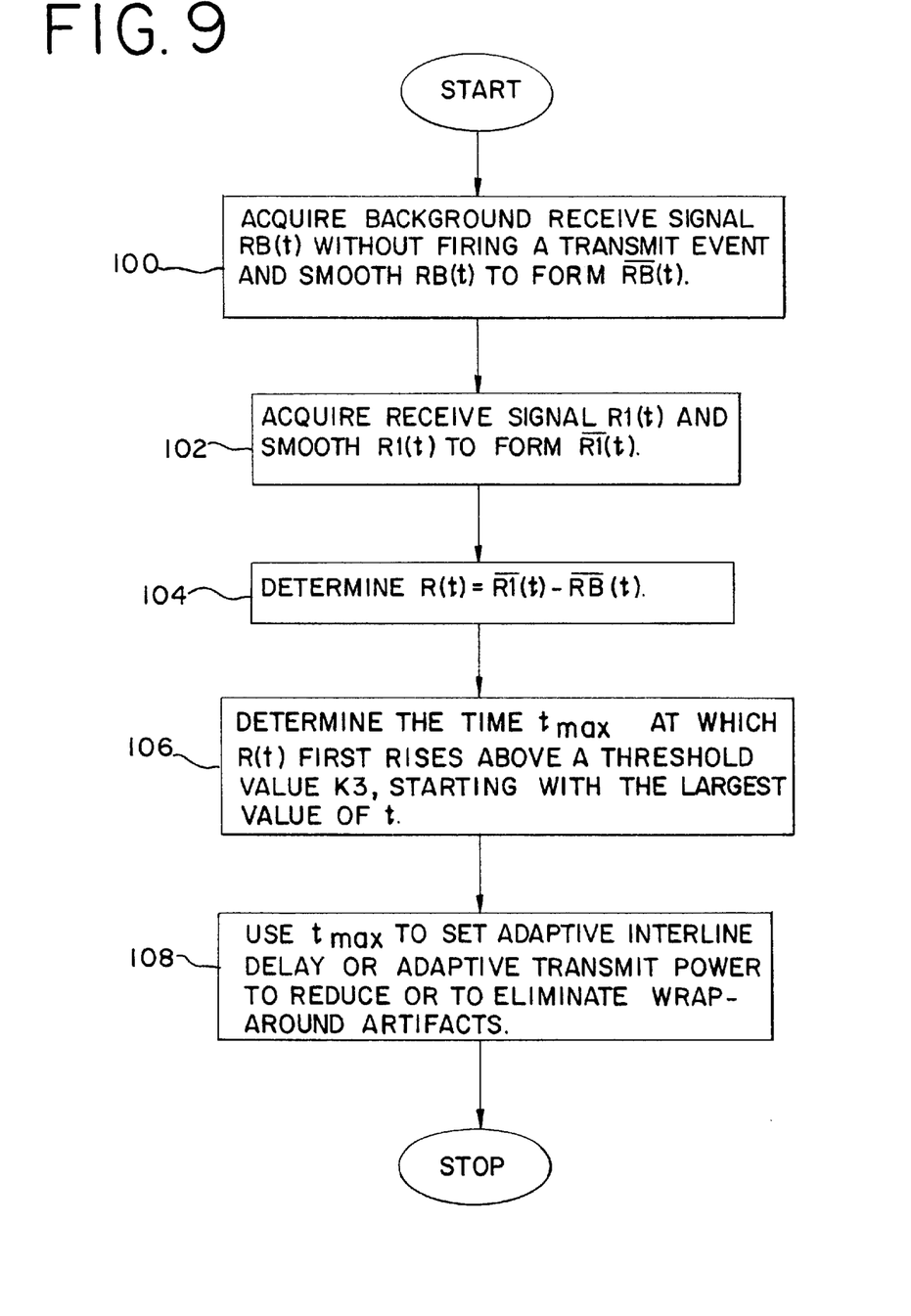
FIG. 9 is a flow chart of a method performed by the embodiment of FIG. 8.

FIGS. 8 and 9 related to a third embodiment in this invention that includes a medical ultrasonic imaging system 90. The system 90 includes elements 12 though 20 that may be identical to the corresponding elements described above. In this embodiment, the system 90 includes a low pass filter 92, a delay unit 94, a difference calculator 96, and a penetration detector 98. The line duration calculator 28 and the frame rate control 30 may be identical to the corresponding elements described above.

The low pass filter 92 smooths receive signals applied to the filter 92 by the receive beamformer, and supplies the smoothed receive signals to the delay unit 94 and the difference calculator 96. The difference calculator 96 forms a difference signal $R(t)$ that is applied to the penetration detector 98. The system 90 of FIG. 8 implements the method flow charted in FIG. 9.

As shown in FIG. 9, the first acts in this method are to acquire a background receive signal $RB(t)$ without firing a preceding transmit event and to smooth $RB(t)$ to form $\overline{RB}(t)$. These acts are accomplished in block 100. The background receive signal $\overline{RB}(t)$ provides a mean noise image, because it is acquired without any preceding transmit event close enough in time to increase the signal level.

Next, a receive signal $R1(t)$ is acquired at 102 and smoothed to form $\overline{R1}(t)$. The receive signal $R1(t)$ is acquired with long duration.

Next, a difference signal $R(t)$ is determined at 104 as a function of the difference between $\overline{R1}(t)$ and $\overline{RB}(t)$. Thus, the difference signal $R(t)$ is a measure of how much the smoothed receive signal $\overline{R1}(t)$ exceeds the background noise level as indicated by $\overline{RB}(t)$.

At 106, the time $t_{max}$ is determined at which $R(t)$ first rises above a threshold value K3, starting the thresholding with the largest values of t.

At 108, the parameter $t_{max}$ is used to set the adaptive interline delay or the adaptive transmit power to reduce or eliminate wraparound artifacts, as described above. As before, the method of FIG. 9 can be repeated on a scan line by scan line basis, a group of scan lines by group of scan lines basis, a frame by frame basis, or a group of frames by group of frames basis.

In modified forms of the system 90 the background noise can be estimated in other ways, as for example with a model of the system that calculates or looks up background noise as a function of currently prevailing imaging parameters of the system 90.

Figure 10:
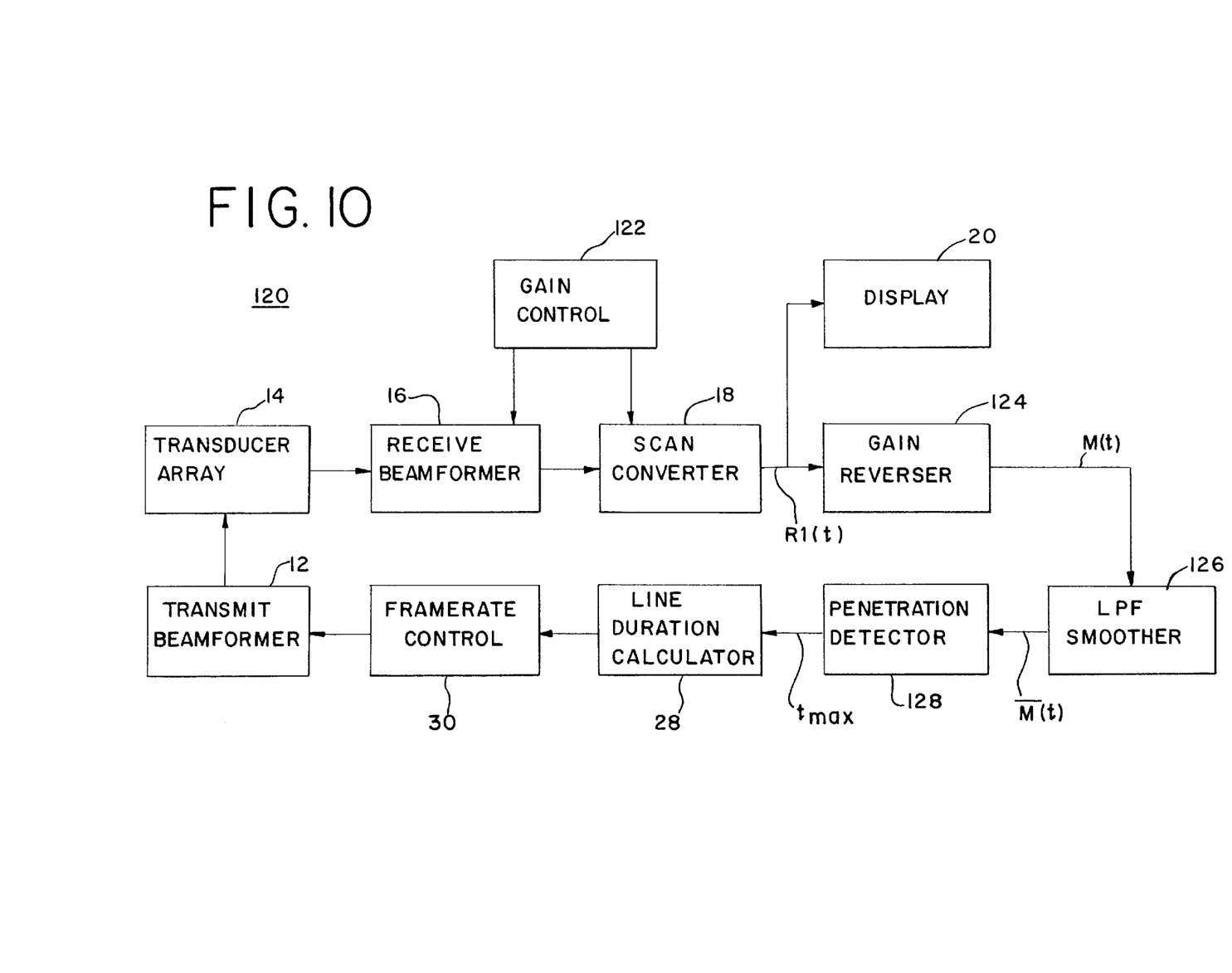
FIG. 10 is a block diagram of a medical diagnostic ultrasonic imaging system that incorporates a fourth preferred embodiment of this invention.
Figure 11:
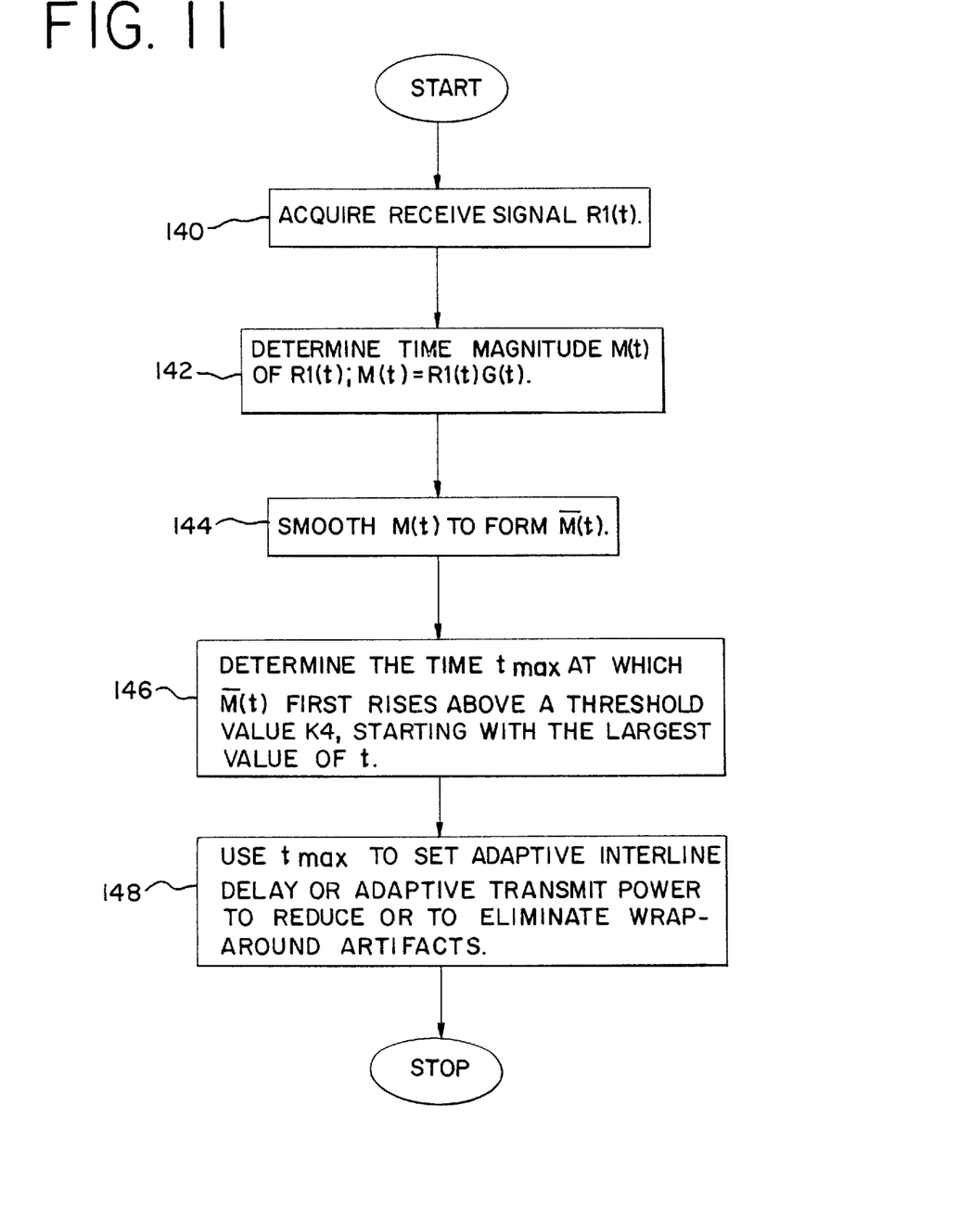
FIG. 11 is a flow chart of a method performed by the embodiment of FIG. 10.

FIGS. 10 and 11 relate to a fourth embodiment of this invention that uses a medical diagnostic ultrasonic imaging system 120. System 120 includes elements 12 through 20 that may be identical to the corresponding elements described above. Similarly, the line duration calculator 28 and the frame rate control 30 may also be identical to corresponding elements of the foregoing embodiments.

The system 20 includes a gain control 122 that controls the gain of the receive beamformer 16 and the scan converter 18 as a function of time following a transmit event. The scan converter 18 applies scan converted receive signals in parallel to the display 20 and to a gain reverser 124. The gain reverser 124 reverses or undoes the depth dependent gain applied by the gain control 122 to estimate the true magnitude $M(t)$ of the receive signals $R1(t)$. The output of the gain reverser 124 is applied to a low pass filter smoother 126 for speckle reduction, and the smoothed true magnitude $\overline{M}(t)$ is applied to a penetration detector 128. The penetration detector uses a threshold value to determine the maximum penetration depth.

The method implemented by the system 120 of FIG. 10 is flow charted in FIG. 11. First, a receive signal $R1(t)$ is acquired at 140. Then, the magnitude $M(t)$ of $R1(t)$ is determined at 142 by dividing $R1(t)$ by the gain $G(t)$ previously applied by the gain control 122. Next, $M(t)$ is smoothed at 144 to form $\overline{M}(t)$.

At 146, the time $t_{max}$ is determined at which $\overline{M}(t)$ first rises above a threshold value K4, starting the thresholding with the largest value of t. The threshold value K4 is predetermined based on knowledge of the thermal noise of the system. For example K4 can be set equal to the mean value of the thermal noise. The mean value of thermal noise can be determined either from lab measurements or models of the ultrasound system. At 148, the parameter $t_{max}$ is used to set the adaptive interline delay or the adaptive transmit power to reduce or eliminate wraparound artifacts. Any of the patterns described above can be used to determine when the method of FIG. 11 is performed.

The present invention is applicable to the widest variety of ultrasonic imaging modes, and the receive signals discussed above can be B-mode signals, M-mode signals, color Doppler signals or PW signals acquired at either the fundamental or a harmonic frequency, with or without the use of added contrast agent. As used therein, the term "harmonic frequency" is intended to include integer harmonics, fractional harmonics, and sub harmonics.

This invention can also be used with receive signals at various stages in the signal processing path, either before or after beamformation, before or after detection, and before or after scan conversion. In many cases, implementation is simplified if post-detection, post-beamformation receive signals are used, though this is not a requirement of the present invention.

The foregoing preferred embodiments provide the advantage that only a single pass through the disclosed methods is required to select an adaptively determined interline delay and/or transmit power that substantially eliminates wraparound artifacts. In alternative embodiments, receive signals can be compared as described above (on either a line by line basis or a frame by frame basis) to determine whether the duration of a current receive signal is excessive for currently prevailing imaging conditions. If such a condition is detected, the system can simply alter the interline delay or the transmit power by a selected increment and then repeat the process to determine whether or not the wraparound artifact has been eliminated. This process can then continue as needed until the wraparound artifact has been eliminated. For example, the method of FIG. 7 may be performed. If R(t) exceeds K2, the interline delay may be increased by 10% and the method of FIG. 7 repeated until R(t) remains below K2 for the entire scan line.

Of course, it should be understood that many changes and modifications can be made to the preferred embodiments described above. The widest variety of circuits, computers, programs, and signal processing techniques (including digital as well as analog signal processing techniques) can be used to implement the functions described above. It is therefore intended that the foregoing detailed description be regarded as illustrative rather than limiting. It is only the following claims, including all equivalents, that are intended to define the scope of this invention.

What is claimed is:

1. A method for adjusting a transmitter in a medical diagnostic ultrasonic imaging system, said method comprising:
   (a) determining a penetration depth parameter from receive signals generated by said imaging system;
   (b) automatically adaptively varying at least one of interline delay and transmit power of said imaging system as a function of the penetration depth parameter determined in (a).

2. The method of claim 1 wherein act (a) comprises:
   (a1) transmitting first and second pulses on identical acoustic lines;
   (a2) receiving first and second receive signals in response to the first and second pulses, respectively;
   (a3) determining a cross-correlation coefficient between the first and second receive signals; and
   (a4) setting the penetration depth parameter as a function of said cross-correlation coefficient in (a3).

3. The method of claim 1 wherein act (a) comprises:
   (a1) transmitting a first acoustic pulse;
   (a2) transmitting a second acoustic pulse after a first, shorter interline delay and receiving first receive signals in response thereto;
   (a3) transmitting a third acoustic pulse after a second, longer interline delay and receiving second receive signals in response thereto;
   (a4) determining a difference between said first and second receive signals; and
   (a5) setting the penetration depth parameter as a function of said difference of (a4).

4. The method of claim 1 wherein act (a) comprises:
   (a1) receiving thermal noise generated background signals without transmitting a corresponding acoustic pulse;
   (a2) transmitting an acoustic pulse and receiving first receive signals in response thereto;
   (a3) determining a difference between the background signals and said first receive signals; and
   (a4) setting the penetration depth parameter as a function of said difference of (a3).

5. The method of claim 1 wherein act (a) comprises:
   (a1) transmitting an acoustic pulse and receiving receive signals in response thereto;
   (a2) estimating true magnitude of the receive signals; and
   (a3) setting said penetration depth parameter as a function of said true magnitude estimate of (a2).

6. The method of claim 1 further comprising:
   (c) repeating acts (a) and (b) on a scanline by scanline basis.

7. The method of claim 1 further comprising:
   (c) repeating acts (a) and (b) on a frame by frame basis.

8. A method for adjusting a transmitter in a medical diagnostic ultrasonic imaging system, said method comprising:
   (a) acquiring receive signals with said system from at least two transmit events;
   (b) automatically adaptively varying at least one of interline delay and transmit power of the system as a function of a comparison of said receive signals acquired in (a).

9. The method of claim 8 wherein (b) comprises:
   (b1) determining a cross correlation coefficient between said receive signals associated with two different transmit events; and
   (b2) automatically adaptively varying at least one of interline delay and transmit power of the system as a function of the cross correlation coefficient determined in (b1).

10. The method of claim 8 wherein (b) comprises:
    (b1) determining a difference between the receive signals associated with two different transmit events; and
    (b2) automatically adaptively varying at least one of interline delay and transmit power of the system as a function of said difference determined in (b1).

11. A method for adjusting a transmitter in a medical diagnostic ultrasonic imaging system, said method comprising:

(a) acquiring receive signals with the system;
(b) automatically adaptively varying at least one of interline, delay and transmit power of the system as a function of a comparison of said receive signals acquired in (a) and background receive signals.

12. A method for adjusting a transmitter in a medical diagnostic ultrasonic imaging system, said method comprising:

(a) acquiring receive signals with the system;
(b) estimating the magnitude of the receive signals acquired in (a); and
(c) automatically adaptively varying at least one of interline delay and transmit power of the system as a function of the magnitude estimated in (b).

* * * * *